(No Model.)

J. T. SELL.
Sand Trap.

No. 230,579. Patented July 27, 1880.

Witnesses:
Henry Chadbourn.
John H. Foster.

Inventor:
James T. Sell.
by Alban Andrew
his atty.

UNITED STATES PATENT OFFICE.

JAMES T. SELL, OF CAMBRIDGEPORT, ASSIGNOR TO BENJAMIN F. SMITH, OF SOMERVILLE, MASSACHUSETTS.

SAND-TRAP.

SPECIFICATION forming part of Letters Patent No. 230,579, dated July 27, 1880.

Application filed March 29, 1880. (No model.)

*To all whom it may concern:*

Be it known that I, JAMES T. SELL, a citizen of the United States, residing at Cambridgeport, in the county of Middlesex and State of Massachusetts, have invented certain new and useful Improvements in Sand-Traps for Artesian or Driven Wells; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements on the patent granted to me on the 11th of September, 1877, No. 195,051, for sand-traps for Artesian or driven wells.

My present invention consists in a novel construction and combination of parts, which will be fully hereinafter described, and specifically pointed out in the claims.

Figure 1:
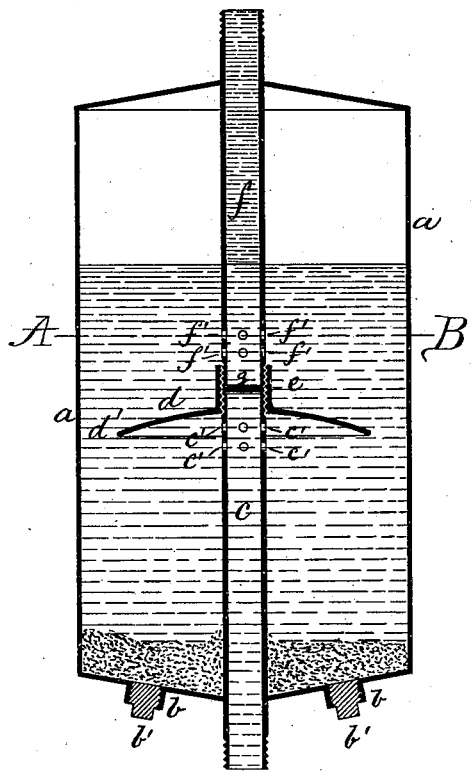
Figure 2:
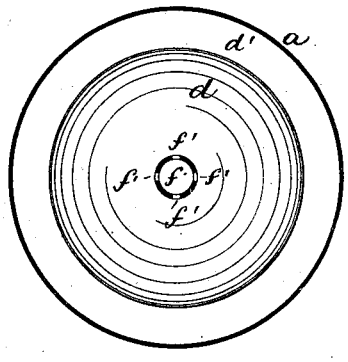

In the accompanying drawings, Figure 1 represents a central longitudinal section, and Fig. 2 represents a cross-section on the line A B, shown in Fig. 1.

In the drawings, $a$ represents the sand-chamber, having sand-outlets $b\ b$, covered with screw-plugs $b'\ b'$, as usual. $c$ is the inlet-pipe, provided with side perforations, $c'\ c'$, in its upper end, as shown in Fig. 1. $d$ is the inverted stationary shield, which is constructed with the central aperture having internal screw-threads, as at $e$, into which the ends of the inlet and outlet pipes $c$ and $f$ are screwed. $d'$ is the annular space between the outer edge of the said shield $d$ and the inner surface of the chamber $a$, as and for the purpose set forth. $f$ is the outlet-pipe from the upper part of the chamber $a$, which pipe is provided in its lower end with lateral perforations $f'\ f'$.

The screw-coupling $e$ unites the ends of the pipes $c$ and $f$, between the adjoining ends of which is located a washer, $g$, as shown in Fig. 1, to prevent the water that passes up through the inlet-pipe $c$ from going directly out through the outlet-pipe $f$ without first striking against the under side of the inverted stationary shield $d$.

I am aware of Patent No. 98,503, which shows a sand-chamber for well-pumps constructed with an inlet-pipe extending into the chamber and provided at its upper end with arms carrying an inverted shield, and I hereby disclaim the construction and arrangement shown in said patent, as such is not my invention.

What I wish to secure by Letters Patent, and claim, is—

1. The combination of the sand-chamber $a$, the inlet and outlet pipes $f f$, extending respectively through the bottom and top of the chamber to or near the center thereof, and each having lateral perforations $c'\ f'$, with the inverted shield $d$, having a central aperture, into which are fitted the ends of the inlet and outlet pipes, and a partition, $g$, for cutting off direct communication between said pipes, all substantially as described, for the purpose set forth.

2. The combination of the sand-chamber $a$, the inlet and outlet pipes $f\ f$, extending respectively through the bottom and top of said chamber to or near the center thereof, and provided at their adjacent ends with external screw-threads, an interposed imperforate partition, $g$, and lateral perforations $c'\ f'$, with the inverted shield $d$, having an internally screw-threaded opening, into which are screwed the adjacent ends of the inlet and outlet pipes, said shield being arranged between the lateral perforations $c'\ f'$, all substantially as and for the purpose described.

In testimony whereof I have affixed my signature in presence of two witnesses.

JAMES T. SELL. [L. S.]

Witnesses:
ALBAN ANDRÉN,
HENRY CHADBOURN.